(12) United States Patent
Nussbaumer

(10) Patent No.: US 9,000,636 B2
(45) Date of Patent: Apr. 7, 2015

(54) MAGNETIC BEARING APPARATUS

(75) Inventor: Thomas Nussbaumer, Zurich (CH)

(73) Assignee: Thoratec Switzerland GmbH, Zurich (CH)

( * ) Notice: Subject to any disclaimer, the term of this patent is extended or adjusted under 35 U.S.C. 154(b) by 889 days.

(21) Appl. No.: 13/006,289

(22) Filed: Jan. 13, 2011

(65) Prior Publication Data

US 2011/0187217 A1 Aug. 4, 2011

(30) Foreign Application Priority Data

Jan. 29, 2010 (EP) .................................... 10152085

(51) Int. Cl.
*H02K 7/09* (2006.01)
*G01B 7/14* (2006.01)
*F16C 32/04* (2006.01)
*G01D 5/20* (2006.01)

(52) U.S. Cl.
CPC ............ *G01B 7/144* (2013.01); *F16C 32/0446* (2013.01); *F16C 32/048* (2013.01); *G01D 5/202* (2013.01)

(58) Field of Classification Search
CPC ............. H02K 7/09; H02K 9/12; G01B 7/14; F16C 35/002
USPC ....... 310/68 B, 86, 90.5; 324/207.15–207.19, 324/207.22, 207.25, 207.26, 232
See application file for complete search history.

(56) References Cited

U.S. PATENT DOCUMENTS

| | | | |
|---|---|---|---|
| 4,652,820 A | 3/1987 | Maresca | |
| 6,350,109 B1 | 2/2002 | Brunet et al. | |
| 6,351,048 B1 * | 2/2002 | Schob et al. | 310/90.5 |
| 7,315,100 B2 * | 1/2008 | Chen et al. | 310/90.5 |
| 7,738,221 B2 * | 6/2010 | Kojovic et al. | 361/36 |
| 2003/0030431 A1 * | 2/2003 | Reininger | 324/207.2 |
| 2007/0200443 A1 * | 8/2007 | Baudelocque et al. | 310/90.5 |
| 2007/0229064 A1 | 10/2007 | Van Steenwyk et al. | |

FOREIGN PATENT DOCUMENTS

| | | |
|---|---|---|
| DE | 42 15 381 A1 | 11/1993 |
| DE | 195 39 975 A1 | 5/1996 |
| EP | 1 793 207 A1 | 6/2007 |

OTHER PUBLICATIONS

Xianglin et al., Flexible eddy current sensor array for proximity sensing, www.sciencedirect.com, Aug. 4, 2006.*

* cited by examiner

*Primary Examiner* — Michael Andrews
*Assistant Examiner* — David Scheuermann
(74) *Attorney, Agent, or Firm* — Kilpatrick Townsend & Stockton LLP

(57) ABSTRACT

A magnetic bearing apparatus is proposed having a stator (2) which includes a winding (22) for the generation of a magnetic control field, having a rotor (3) which can be magnetically journalled with respect to the stator (2) and also having a sensor device (5) configured as an eddy current sensor for the determination of the distance between the stator (2) and the rotor (3), wherein the sensor device (5) includes at least one sensor element (51) configured as an inductor and at least one capacitor (53) which forms an electrical resonant circuit with the inductor, and also having a monitoring unit (6) for the control of the sensor device (5) and for the evaluation of the detected signals. The inductor is arranged electrically in series to the capacitor (53) so that the electrical resonant circuit is a serial resonant circuit.

14 Claims, 3 Drawing Sheets

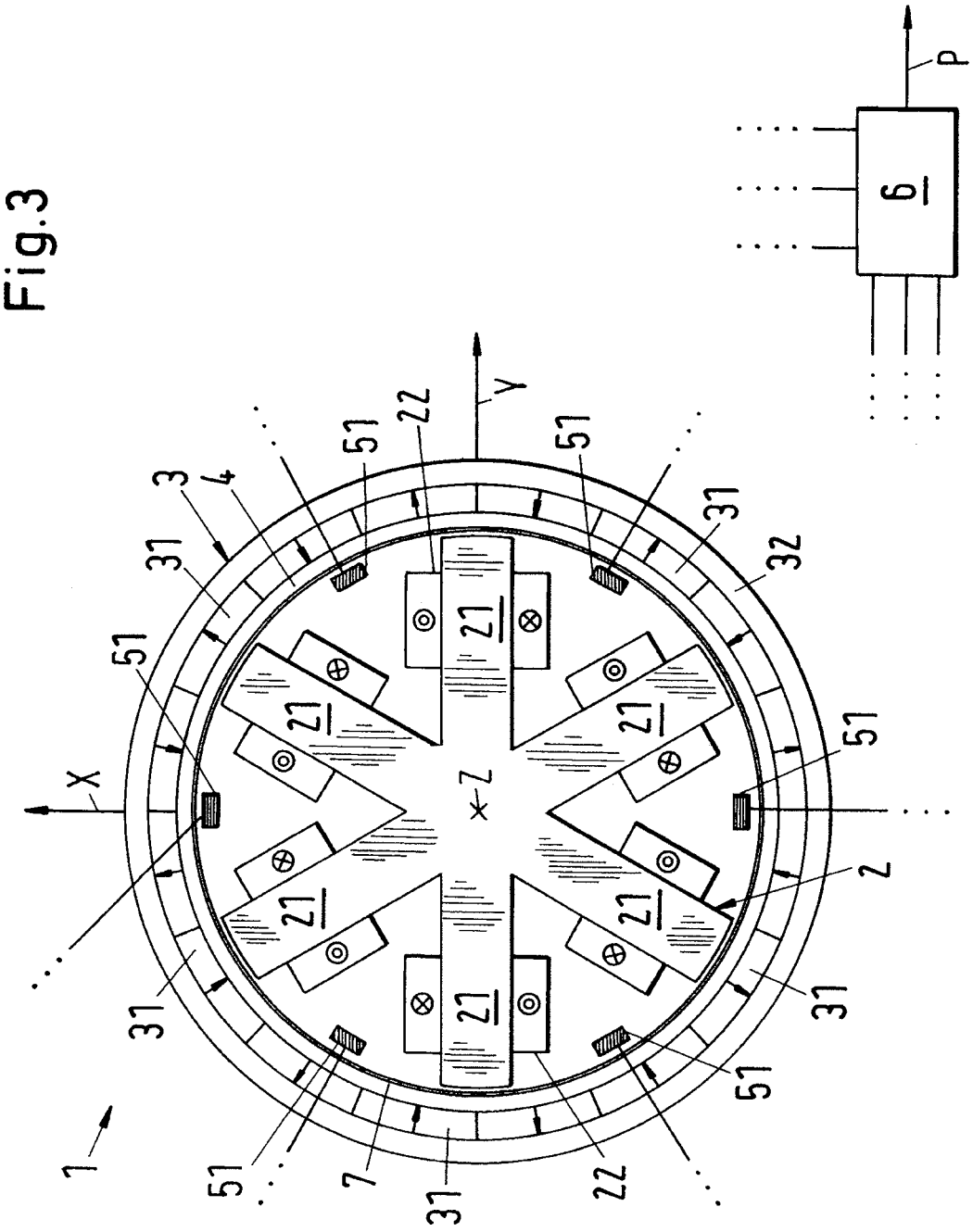

MAGNETIC BEARING APPARATUS

CROSS REFERENCE TO RELATED APPLICATIONS

Figure 1:
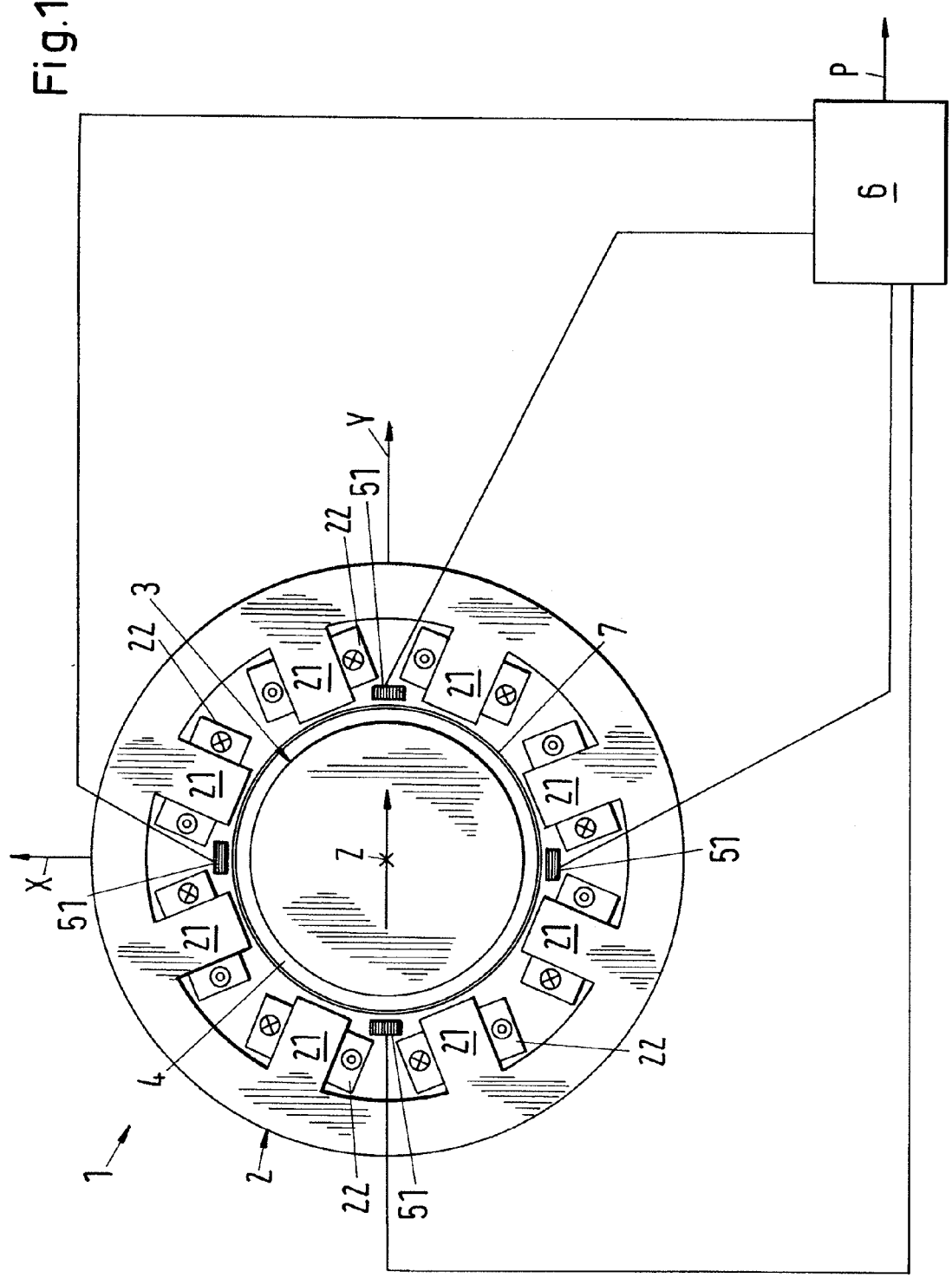

This application claims the priority of European Application No. 10 152 085.6, filed on Jan. 29, 2010, the disclosure of which is incorporated herein by reference.

The invention relates to a magnetic bearing apparatus in accordance with the preamble of the independent claim.

Magnetic bearing apparatus for the contactless bearing of a rotor, e.g. the rotor in an electric motor, rotating shafts, pump rotors, mixers, stirring apparatus, etc. are becoming more and more important in a number of areas. For example, wafers in semiconductor manufacture or wafer chucks are magnetically journalled, for instance, to apply photoresist coatings or similar to the rotating wafer. Magnetic bearings are also increasingly found in the area of bioreactors in order to journal the stirring element, pumping element or mixing element in a hovering manner through the reactor wall in the bioreactor without any mechanical contact.

A special form of a magnetic bearing apparatus is represented by a so-called bearingless motor. This is an electromagnetic rotary drive with a magnetically journalled rotor in which the stator is configured as a bearing stator and drive stator for the magnetic journaling of the rotor and the drive of the rotation of the rotor about the axis of rotation.

Frequently, in this respect, the rotor is made as permanently magnetic and/or disk-shaped or ring-shaped.

Such a bearingless motor is disclosed, for example, in EP-A-0 860 046 and also in EP-A-0 819 330. The term bearingless motor means that the motor is journalled completely magnetically, with no separate magnetic bearings being provided. For this purpose, the stator is made as a bearing stator and drive stator; it is therefore both the stator of the electric drive and the stator of the magnetic bearing. For this purpose, the winding of the stator includes a drive winding with the pole pair number p as well as a control winding with the pole pair number p±1. A rotating magnetic field can be produced using these two windings which, on the one hand, exerts a torque onto the rotor which effects its rotation and which, on the other hand, exerts a shear force, which can be set as desired, onto the rotor so that the rotor's radial position can be controlled or regulated actively. The degrees of freedom of the rotor can thus be actively regulated. The rotor is passively magnetically, that is not controllably, stabilized by reluctance forces with respect to three further degrees of freedom, namely its axial deflection in the direction of the axis of rotation and tilts with respect to the plane perpendicular to the axis of rotation A (two degrees of freedom). Reference is made to the already cited documents with respect to further details of such a bearingless motor.

The bearingless motor can be designed as an internal rotor, that is with an inwardly disposed rotor and a stator arranged around it, or as an external rotor, that is with an inwardly disposed stator and a rotor arranged around it.

Special importance accrues to the sensors in magnetic bearing apparatus, with which sensors the position of the rotor relative to the stator is measured, since this information is necessary for the regulation of the rotor location. Typically, the rotor position is determined by contactlessly operating distance sensors with which the rotor location in the X-Y plane perpendicular to the desired axis of rotation is determined, with at least one distance sensor being provided, for example, for the X direction and the Y direction. Inductive sensors, eddy current sensors or magnetic field probes such as Hall sensors or magnetoresistive sensors are known as sensors, for example.

The signal-to-noise ratio (SNR) of the sensor is decisive for the quality and stability of the position regulation. Serious problems can occur in practice in this respect since the environment in which the sensor works is by no means ideal. Strong alternating magnetic fields are present—they are particularly pronounced if a driving torque is additionally generated beside the magnetic journaling to set the rotor into rotation. In addition, as a rule, high currents and high voltages should be connected. The current and voltage changes accompanying this cause alternating electromagnetic fields which result in a high interference coupling into the sensor, which has the same effect as a high noise level. At the same time, the coupling of the sensors to the medium to be measured—this is the rotor as a rule—is weak. For example, in applications in which the width d of the air gap between the rotor and the stator is large, e.g. 7-10 mm, the 1/d dependency of the inductivity of an inductive sensor results in extremely weak signals so that the SNR drops overall to a value which is so low that a reliable bearing regulation can only be realized—if at all—with a very high effort and/or cost.

A further critical case for the regulation of the rotor position is when a metallic medium, e.g. a metal wall, is provided between the rotor and the stator. This can be the case, for example, in bioreactors or in mixers in which the rotor is located in a steal container or in a metal container and the stator surrounds the metal container to magnetically journal the rotor through the metal wall. In such cases, the contactless distance measurement must take place through the metal wall, which can in particular result in very substantial problems with metals of relatively low conductivity, e.g. high-alloyed titanium or high-alloyed chromium steel with a high nickel content.

Starting from this prior art, it is therefore an object of the invention to propose a magnetic bearing apparatus which enables a reliable monitoring of the position of the rotor in a simple manner, in particular also under difficult operating conditions such as large air gaps between the rotor and the stator.

The magnetic bearing apparatus which satisfies this object is therefore characterized by the features of the independent claim.

In accordance with the invention, a magnetic bearing apparatus is proposed having a stator which includes a winding for the generation of a magnetic control field, having a rotor which can be magnetically journalled with respect to the stator and also having a sensor device configured as an eddy current sensor for the determination of the distance between the stator and the rotor, wherein the sensor device includes at least one sensor element configured as an inductor and at least one capacitor which forms an electrical resonant circuit with the inductor, and also having a control unit for the control of the sensor device and for the evaluation of the detected signals. The inductor is arranged electrically in series to the capacitor so that the electrical resonant circuit is a serial resonant circuit. Since the eddy current sensor includes an electric serial resonant circuit in which the inductor and the capacitor are connected electrically in series, on a resonant excitation, a multiply amplified measured signal or response signal can be generated, whereby a considerably more favorable signal-to-noise ratio results. The signal stroke of the sensor device can be increased by a factor of 10 to 50 with the bearing apparatus in accordance with the invention. This allows a substantially more precise, more stable monitoring or regulation of the rotor position as well as applications which are not possible with currently known eddy current sensors—at least not in a simple manner.

A magnetic bearing apparatus in which a metallic wall is provided between the rotor and the stator is also advantageously possible by this sensor device which is very sensitive due to the high SNR. A distance measurement is namely possible in a reliable manner through a metal wall with the sensor device in accordance with the invention.

The invention is also suitable for metallic housings, for example tanks of mixers or bioreactors. In a preferred embodiment, a metallic housing is therefore provided between the rotor and the stator in the magnetic bearing apparatus.

It is a particularly advantageous measure if each sensor element is configured as an air core coil, that is the coil is not filled with a core material. Problems can hereby be avoided which can be caused by changes in the magnetic permeability of the core material on changes of the magnetic fields.

In a preferred embodiment, the stator has a plurality of stator teeth and each sensor elements is arranged between two adjacent stator teeth.

It is an advantageous measure to provide an even number of sensor elements, with in each case two of the sensor elements being diametrically opposed. This arrangement allows a difference measurement for each measurement direction—that for example for the X direction and for the Y direction, whereby systematic errors in the distance measurements can be eliminated.

The monitoring unit for the determination of the distance preferably determines at least one difference signal which results from the difference of the measured signals which originate from two diametrically opposed sensor elements.

To improve the evaluation of the measured signal even further, it is preferred that the monitoring unit excites each electrical resonant circuit of the sensor device by an excitation signal of presettable frequency and demodulates the measured signal originating from the respective resonant circuit by a demodulation signal, wherein the demodulation signal has the same frequency as the excitation signal for the respective resonant circuit. The excitation signal, which is of radio frequency as a rule, can herewith be removed from the measured signal. The frequency of the excitation is approximately at the resonant frequency of the respective electrical resonant circuit.

The demodulation can be improved if the demodulation signal has a phase shift, in particular a phase shift of 90°, relative to the excitation signal.

In a first embodiment, the magnetic bearing apparatus is configured as an inner rotor, wherein the rotor is arranged within the stator.

In a second embodiment, the magnetic bearing apparatus is configured as an outer rotor, wherein the stator is arranged within the rotor.

The rotor is preferably configured as permanently magnetic.

Such embodiments are also preferred in which the rotor is configured in disk-shape or in ring-shape.

A particularly preferred embodiment of the magnetic bearing apparatus is when the bearing apparatus is made as a bearingless motor, wherein the stator is configured as a bearing stator and drive stator and the rotor forms the rotor of the bearingless motor.

Further advantageous measures and embodiments of the invention result from the dependent claims.

Figure 2:
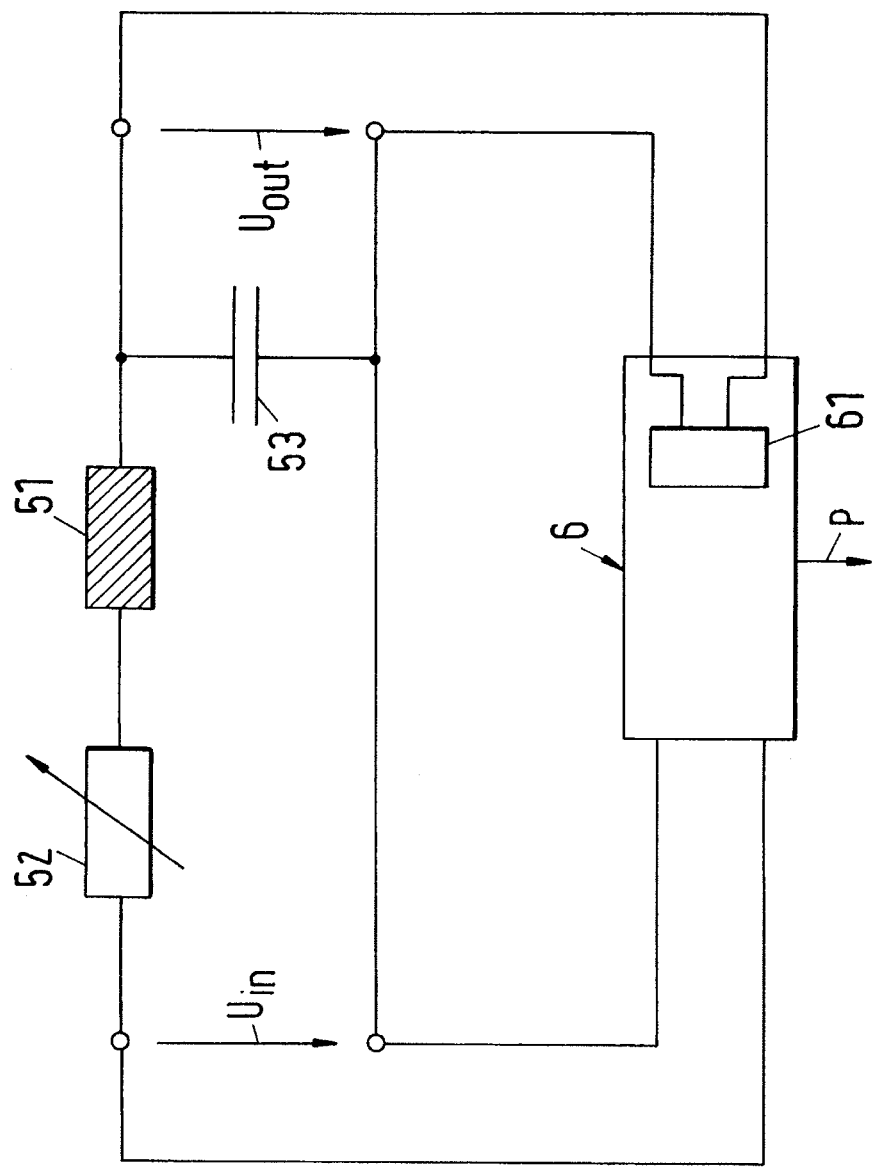

The invention will be explained in more detail in the following with reference to embodiments and to the drawing. There are shown in the schematic drawing, partly in section:

FIG. 1: a schematic representation of a first embodiment of a magnetic bearing apparatus in accordance with the invention;

FIG. 2: a schematic representation of a sensor device; and

FIG. 3: a schematic representation of a second embodiment of a magnetic bearing apparatus in accordance with the invention.

FIG. 1 shows in a schematic representation essential parts of a first embodiment of a magnetic bearing apparatus in accordance with the invention which is designated as a whole by the reference numeral 1. The bearing apparatus 1 is specifically configured as a bearingless motor, which will be explained further below.

The magnetic bearing apparatus 1 in accordance with the invention includes a stator 2 and a rotor 3 which is can be magnetically journalled with respect to the stator 2.

In the first embodiment, the bearing apparatus 1 is configured as an inner rotor, that is the rotor 3 is arranged within the stator 2. An air gap 4 is provided between the rotor 3 and the stator 2. The stator 2 includes a plurality of radially inwardly directed stator teeth 21 as well as a winding 22 for the generation of a magnetic control field which is configured in the form of a plurality of discrete coils which are each arranged on the stator teeth 21. The rotor 3 is configured as a disk-shaped, permanently magnetic rotor 3 whose magnetization is indicated in FIG. 1 by the arrow without a reference numeral. The rotor 3 is arranged in the X-Y plane which is fixed by the axes X and Y which and which stands perpendicular on the Z axis which coincides with the desired axis of rotation of the rotor 3. Alternatively, the rotor 3 or its magnetic part can also be configured as ring-shaped.

Furthermore, a sensor device 5 is provided (see also FIG. 2) which is configured as an eddy current sensor to determine the distance between the rotor 3 and the stator 2 so that the relative position of the rotor 3 within the stator 2 can be determined. The sensor device 5, which will be looked at in more detail further below, includes four sensor elements 51 in the first embodiment of which each is respectively arranged between two adjacent stator teeth 21. In each case two of the sensor elements 51 are diametrically opposed, that is are offset with respect to one another by 180° with respect to the peripheral direction of the stator 2. The sensor elements 51 are here arranged on the positive and on the negative X axis and on the positive and on the negative Y axis so that the position of the rotor 3 can be determined in the X-Y plane by a distance measurement in the X direction and in the Y direction.

Each of the sensor elements 51 is connected to a monitoring element 6 which controls the sensor device 5 and evaluates the detected signals of the sensor elements 5. The monitoring unit generates a position signal P from the measured signals detected by the sensor elements 51 and said position signal is representative of the instantaneous location of the rotor 3 in the X-Y plane and is then supplied to a location and position regulator, not shown.

During the operation of the magnetic bearing apparatus 1, a magnetic control field is generated by means of the winding 22 of the stator 2, for example a rotating field which magnetically journals the rotor 3 in a contactless manner or holds it in a hovering manner in a centered location in the X-Y plane. The position of the rotor is in this respect constantly monitored by means of the sensor elements 51 of the sensor device 5 and the position signal P is generated therefrom. For this purpose, the measured signals of the two oppositely disposed sensor elements are subtracted from one another; that is a difference signal is formed for the distance determination both for the X direction and for the Y direction. The measured signal of the sensor element 51 in the negative X direction is subtracted from that of the sensor element in the positive X direction. An analog difference formation takes place for the Y direction. Systematic errors and offset errors can be eliminated by the formation of these difference signals. The position signal P determined therefrom is then supplied to the location regulator, not shown, which modifies the control field on a deviation of the rotor 3 from its desired position so that the rotor 3 again moves into its centered location. This magnetic bearing and its regulation is sufficiently known to the skilled person and therefore does not require any further explanations.

As already mentioned, the magnetic bearing apparatus 1 is configured as an electromagnetic rotary drive in the form of a bearingless motor, with the term bearingless motor having to be understood, as initially explained, namely that no separate magnetic bearings are present for the rotor 3. The stator 2 is both a bearing stator and a drive stator with which a torque can be generated which drives a rotation of the rotor 3 about the axis of rotation Z and with which the rotor 3 can be magnetically journalled. For this purpose, the winding 22 of the stator 2 includes a drive winding with a number of pole pairs p as well as a control winding with the number of pole pairs p±1. The rotor 3 is actively magnetically journalled with respect to its radial position, which means the position in the X-Y plane, that is the radial position of the rotor 3 can be actively controlled or regulated via the winding 22 of the stator 2. The rotor 3 is passively magnetically, that is not controllably, stabilized by reluctance forces with respect to three further degrees of freedom, namely its axial deflection in the direction of the axis of rotation Z and tilts with respect to the X-Y plane perpendicular to the axis of rotation (two degrees of freedom). Reference should be made here to EP-A-0 860 046 and EP A-0 819 330 with respect to further details of the bearingless motor.

The axis of rotation Z of the rotor 3 is the desired axis of rotation about which the rotor 3 rotates when it is centered and not tilted with respect to the stator 2.

The sensor device 5 will now be explained in more detail in the following with reference to FIG. 2. FIG. 2 shows a schematic representation of the sensor device 51, wherein only one of the four sensor elements 51 is shown for reasons of better clarity. The sensor element 51 is configured as an inductor and indeed particularly preferably as an air core coil. The inductor of the sensor element 51 is designated by L. A capacitor 53 is furthermore provided whose value is designated by C and an ohmic resistor 52 whose value is designated by R and which can be configured as a variable resistor 52. The resistor 52 is preferably not present as a really existing, separate component, but is rather realized by the ohmic resistance of the air core coil 51 and/or by the ohmic resistances of the connection lines. The inductor, that is the sensor element 51 and the capacitor 53, form an electric resonant circuit.

In accordance with the invention, the inductor, that is the sensor element 51, is arranged electrically in series with the capacitor 53 so that the electrical resonant circuit is a serial resonant circuit. A much better signal-to-noise ratio can be achieved than with known sensor devices thanks to the configuration of the sensor device 5 as an eddy current sensor which includes one or more electrical serial resonant circuits.

The already explained difference formation of the measured signals of two oppositely disposed sensor elements typically also takes place in the monitoring unit 6, but is not shown in FIG. 2 because only one sensor element 51 can be seen here.

In the operating state, the monitoring unit 6 excites the electrical resonant circuit via a radio frequency alternating voltage source by an excitation signal $U_{in}$, for example an alternating voltage. The frequency of the excitation signal $U_{in}$ is equal to or close to the resonant frequency of the electrical resonant circuit which is given by the circuit frequency $$\omega_0 = (L \cdot C)^{(-0.5)}$$

The response signal or measured signal $U_{out}$ coming from the resonant circuit is detected and supplied to the monitoring unit 6. The amplitude change and/or the phase change, or also other parameters of the measured signal, is/are determined there.

$$G = U_{out}/U_{in} = -i \cdot R^{-1} \cdot (L/C)^{0.5}$$

applies to the complex transfer function G of the resonant circuit which is the quotient from $U_{out}$ and $U_{in}$ at the resonant frequency $\omega_0$,
where i designates the imaginary unit. This dependency can be utilized to optimize the strength of the measured signal $U_{out}$.

In accordance with a preferred embodiment, the measured signal $U_{out}$ is demodulated by a demodulator 61 in the monitoring unit 6. As a rule, this demodulation takes place before the formation of the difference signal. The demodulation takes place, for example, by multiplication of the measured signal by a demodulation signal which has the same frequency as the excitation signal $U_{in}$ by which the resonant circuit is excited. In this respect, it is not necessary that the demodulation signal is a sinusoidal signal, it can by all means also include higher harmonics. The demodulation signal can thus, for example, be a square wave voltage whose fundamental frequency is the same frequency as that of the excitation signal by which the resonant circuit is excited. The radio frequency portion of the measured signal can be separated by this demodulation and can then be filtered, for example by means of a low pass.)

In a particularly preferred embodiment, the demodulation takes place with a phase shift, that is the demodulation signal is displaced in phase with respect to the excitation signal. This phase shift particularly preferably amounts to 90° because this corresponds to the phase shift which the electrical resonant circuit causes on excitation with its resonant frequency between the excitation signal and the measured signal.

Since the electrical resonant circuit is a serial resonant circuit, the measured voltage $U_{out}$ can be larger than the voltage of the excitation signal $U_{in}$. In practice, it has proved reliable if the amplitude of the measured signal is larger than this amplitude of the excitation signal by at least a factor of 2. The measured voltage can, however, by all means also reach values of 10 to 50 times the voltage of the excitation signal. The measured signal can optionally be scaled down again in the monitoring unit 6 to a technically meaningful signal-electronic voltage value which is then output as a position signal P.

It is alternatively naturally also possible to detect the measured signal at the capacitor 53.

As already mentioned, the sensor elements 51 are each arranged between two adjacent stator teeth 21 in a preferred embodiment. The capacitors required for the electric resonant circuit can preferably be provided on an electronic print on which the monitoring unit 6 or also other components of the magnetic bearing apparatus are provided, for example the bearing regulator or the control and regulation electronics for the bearingless motor or for the magnetic bearing apparatus.

The sensor device 5 of the bearing apparatus in accordance with the invention is an eddy current sensor in accordance with its principle. With this sensor type for the distance measurement, mainly the real portion of the complex alternating current resistance of the sensor element changes on variations of the distance between the sensor element and the rotor. It reacts to changes of the magnetic fields caused by the eddy currents.

As already mentioned, the sensor elements 51 are particularly preferably air core coils, that is the sensor elements 51 have no core material (different from air) about which the coil is wound. The space surrounded by the winding of the air core coil is only filled with air, but not with any other core material. It is avoided by this measure that the magnetic properties of the core material result in falsifications of the measured signal. The strong magnetic field changes in the region of the sensor elements 51 could influence the permeability of the core material. Air core coils are therefore preferred as sensor elements 51.

It has been found that the use of air core coils is not only advantageous for the magnetic bearing apparatus in accordance with the invention, but rather that such air core coils can also be used generally and independently of the present invention in sensor devices, in particular in sensor device which are used in strong magnetic fields or in strongly changing magnetic fields. Air core coils are specifically suitable for magnetic distance sensors, in particular for eddy current sensors. If, for example, such an air core coil is connected together with a capacitor electrically in series to a serial resonant circuit, sensors can be realized with a particularly high sensitivity.

In the magnetic bearing apparatus 1 in accordance with the invention, the sensor device 5 is so good or is characterized by such a good signal-to-noise ratio that previously also very problematic application cases can be easily realized. For example, a magnetic bearing apparatus can thus be realized in which the width of the air gap 4 between the stator 2 and the rotor 3 is very large, e.g. seven to ten millimeters or even more. Another previously problematic application is when a wall, specifically a metallic wall, or a metallic housing, is provided between the stator 2 and the rotor 3. This can be the case, for example, with canned motors or in wafer production or in mixer applications or in agitator applications. For example, an agitating element or mixing element or a chuck for a wafer can thus be provided in a metallic process chamber or in a metallic reaction or storage vessel so that the rotor 3 forms a magnetic bearing apparatus. The stator 2 is arranged outwardly around the vessel and journals and/or rotates the rotor 3 in a magnetically contactless manner through the metallic wall. The embodiment in FIG. 1 shows such a wall 7 between the rotor 3 and the stator 2.

In a number of applications, such metallic process chambers are made of high-quality metal alloys which as a rule have an electrical conductivity low for metals. For example, high-alloyed titanium or high-alloyed chromium steel with a high nickel portion are frequently used alloys. In particular with the titanium alloys, alloys of a higher degree are above all used to increase the strength of the material. This increase in the strength is accompanied by a reduction in the electrical conductivity.

In addition to the alloy elements iron and carbon, mainly aluminum and vanadium are used as alloy elements. It is known for specific higher degrees of alloys also to use one or more of the following elements: tin, palladium, molybdenum, nickel, ruthenium, chromium, zirconium, niobium, silicon, cobalt.

The magnetic bearing apparatus 1 in accordance with the invention also enables a reliable and robust journaling of the rotor 3 in such metallic walls. A precise distance measurement can also take place with the sensor device 5 of the bearing apparatus 1 in accordance with the invention through a metallic wall, for example through a wall of a thickness of 0.5 to 1 mm.

FIG. 3 shows in a representation analog to FIG. 1 a second embodiment of a magnetic bearing apparatus 1 in accordance with the invention. Parts which are the same or equivalent with respect to their function are designated by the same reference numerals in the second embodiment as in the first embodiment. The differences between the first and second embodiments will be explained in the following. The explanations given in connection with the first embodiment and preferred embodiments and advantageous measures also apply in accordingly the same manner to the second embodiment or can also be realized in the second embodiment.

In the second embodiment, the magnetic bearing apparatus 1 is configured as an outer rotor in which the stator 2 is arranged within the rotor. The magnetic bearing apparatus is preferably also made as a bearingless motor in the second embodiment.

The stator 2 here includes six stator teeth 21 which are each directed radially outwardly and which each bear discrete coils which in their totality form the winding 22 of the stator 2. The rotor 3 is configured as a ring-shaped permanently magnetic rotor 3 and surrounds the stator 3. The rotor includes a plurality of permanently magnetic segments 31 whose magnetization is in each case indicated by the small arrows without reference numerals. The permanently magnetic segments 31 are alternately magnetized radially outwardly and radially inwardly so that adjacent permanently magnetic segments 31 each have oppositely directed magnetizations. The permanently magnetic segments 31 are surrounded radially outwardly by a ring-shaped iron counterplate 32.

A wall 7, specifically a metallic wall 7 can also be provided in the air gap between the rotor 3 and the stator 2 in the second embodiment.

In the second embodiment, a total of six sensor elements 51 are provided which are diametrically opposed in pairs. The sensor elements 51 belonging to the same pair are therefore arranged offset to one another by 180° with respect to the peripheral direction. Each sensor element 51 is respectively arranged between two adjacent stator teeth 21. Each sensor element 51 is here also connected in each case electrically in series to a capacitor, not shown, in order to form a respective electrical serial resonant circuit. The sensor elements 51 are preferably air core coils. The measurement of the distance in a direction fixed by two sensor elements 51 also takes place here by formation of a difference signal from the measured signals of the two respective sensor elements 51. Since here the distance measurement takes place in three directions with the six sensor elements in the X-Y plane, a redundancy results which can be used, on the one hand to make the measurement more precise and which, on the other hand, makes possible an error tolerance if one or more of the sensor elements 51 fail.

The invention claimed is:

1. A magnetic bearing apparatus having a stator which includes a winding for the generation of a magnetic control field, having a rotor which can be magnetically journalled with respect to the stator, and also having a sensor device configured as an eddy current sensor for the determination of the spacing between the stator and the rotor, wherein the sensor device includes at least one sensor element configured as an inductor and at least one capacitor which forms an electrical resonant circuit with the inductor, as well as having a control unit for the control of the sensor device and for the evaluation of the detected signals, characterized in that the inductor is arranged electrically in series to the capacitor so that the electrical resonant circuit is a serial resonant circuit, wherein each sensor element is configured as air core coil, wherein the amplitude of the measured signal originating from the respective resonant circuit is larger than the amplitude of the excitation signal used for exciting the respective resonant circuit by at least a factor of 2.

2. A magnetic bearing apparatus in accordance with claim 1, wherein a metal wall is provided between the rotor and the stator.

3. A magnetic bearing apparatus in accordance with claim 1, wherein a metal housing is provided between the rotor and the stator.

4. A magnetic bearing apparatus in accordance with claim 1, wherein the stator has a plurality of stator teeth and each sensor element is arranged between two adjacent stator teeth.

5. A magnetic bearing apparatus in accordance with claim 1, wherein the control unit excites each electrical resonant circuit of the sensor device with an excitation signal of a presettable frequency and demodulates the measured signal originating from the respective resonant circuit with a demodulation signal, wherein the demodulation signal has the same frequency as the excitation signal for the respective resonant circuit.

6. A magnetic bearing apparatus in accordance with claim 5, wherein the demodulation signal has a phase shift, in particular a phase shift of 90°, relative to the excitation signal.

7. A magnetic bearing apparatus in accordance with claim 1 configured as an inner rotor in which the rotor is arranged within the stator.

8. A magnetic bearing apparatus in accordance with claim 1 configured as an outer rotor in which the stator is arranged within the rotor.

9. A magnetic bearing apparatus in accordance with claim 1, wherein the rotor is configured as permanently magnetic.

10. A magnetic bearing apparatus in accordance with claim 1, wherein the rotor is configured as disk-shaped or ring-shaped.

11. A magnetic bearing apparatus in accordance with claim 1 configured as a bearingless motor, wherein the stator is configured as a bearing stator and drive stator and the rotor forms the rotor of the bearingless motor.

12. A magnetic bearing apparatus in accordance with claim 1, wherein the control unit excites each electrical resonant circuit of the sensor device at resonance.

13. A magnetic bearing apparatus in accordance with claim 1, wherein the amplitude of the measured signal originating from the respective resonant circuit is 10 to 50 times the amplitude of the excitation signal used for exciting the respective resonant circuit.

14. A magnetic bearing apparatus in accordance with claim 1, wherein the measured signal originating from the respective resonant circuit is scaled down in the control unit.

* * * * *